(12) United States Patent
Apichatachutapan et al.

(10) Patent No.: US 6,784,218 B1
(45) Date of Patent: Aug. 31, 2004

(54) METHOD OF FORMING HIGH RESILIENCE SLABSTOCK POLYURETHANE FOAM DISPLAYING LATEX-LIKE CHARACTERISTICS

(75) Inventors: Wassana Apichatachutapan, Woodhaven, MI (US); Todd J. Green, Canton, MI (US); James A. Mullins, Wyandotte, MI (US); Theodore M. Smiecinski, Woodhaven, MI (US)

(73) Assignee: BASF Corporation, Mt. Olive, NJ (US)

( * ) Notice: Subject to any disclaimer, the term of this patent is extended or adjusted under 35 U.S.C. 154(b) by 0 days.

(21) Appl. No.: 10/392,149

(22) Filed: Mar. 19, 2003

(51) Int. Cl.[7] .................................................. C08J 9/12
(52) U.S. Cl. ....................... 521/133; 521/130; 521/170; 521/174
(58) Field of Search ................................. 521/130, 133, 521/170, 174

(56) References Cited

U.S. PATENT DOCUMENTS

| | | | | |
|---|---|---|---|---|
| 5,132,334 A | * | 7/1992 | Gansen et al. | 521/160 |
| 5,194,453 A | | 3/1993 | Jourquin et al. | |
| 5,360,831 A | | 11/1994 | Lidy et al. | |
| 5,403,088 A | | 4/1995 | Killmer | |
| 5,521,226 A | * | 5/1996 | Bleys | 521/174 |
| 5,648,559 A | * | 7/1997 | Hager | 568/620 |
| 6,127,442 A | * | 10/2000 | Sulzbach et al. | 521/130 |
| RE37,075 E | | 2/2001 | Fiorentini et al. | |
| 6,521,674 B1 | * | 2/2003 | Haley et al. | 521/137 |
| 6,593,387 B2 | * | 7/2003 | Parfondry et al. | 521/174 |
| 6,653,363 B1 | | 11/2003 | Tursi, Jr. et al. | |

FOREIGN PATENT DOCUMENTS

WO 0210245 2/2002

OTHER PUBLICATIONS

PCT International Search Report; International Application No. PCT/US01/24543; International filing date Aug. 1, 2001.

Publication: Entitled "High Resilience Polyurethane Foam with the Performance of Latex Foam" represented at the Polyurethane Foam Association Conference in Salt Lake City, Utah in Oct. 2002 by Todd J. Green and Theodore M. Smiencinski.

Publication: Entitled "Polyurethane Foam Compares Favorably to Latex Foam" by Todd J. Green and Theodore M. Smiencinski, 2003.

Patent Application Entitled "Method Of Forming High Resilience Slabstock Polyurethane Foam" field Mar. 19, 2003.

* cited by examiner

Primary Examiner—John M. Cooney
(74) Attorney, Agent, or Firm—Fernando A. Borrego; Howard & Howard

(57) ABSTRACT

The subject invention provides a method of forming high resilience slabstock polyurethane foam having random cell structures and displaying latex-like feel and characteristics with superior physical performance to latex foam, including complying with California Technical Bulletin 117 and British Standard 5852:Crib 5 flame tests. The method includes the first step of providing an isocyanate-reactive component and an isocyanate component substantially free of toluene diisocyanate comprising diphenylmethane-2,4'-diisocyanate present in an amount of from 15 parts by weight to 55 parts by weight based on 100 parts by weight of the isocyanate component and diphenylmethane-4,4'-diisocyanate present in an amount from 45 parts by weight to 85 parts by weight based on 100 parts by weight of the isocyanate component to react with the isocyanate-reactive component. A first nucleation gas is provided under low pressure and is added into at least one of the isocyanate-reactive component and the isocyanate component to produce a first cell structure in the polyurethane foam. A second nucleation gas different than the first nucleation gas is provided under low pressure and is added into at least one of the isocyanate-reactive component and the isocyanate component to produce a second cell structure in the polyurethane foam different than the first cell structure.

23 Claims, 1 Drawing Sheet

METHOD OF FORMING HIGH RESILIENCE SLABSTOCK POLYURETHANE FOAM DISPLAYING LATEX-LIKE CHARACTERISTICS

BACKGROUND OF THE INVENTION

1. Field of the Invention

The subject invention relates to a method of forming high resilience slabstock polyurethane foam having random cell structures and displaying physical properties superior to latex foam while exhibiting latex-like feel and characteristics.

2. Description of the Related Art

The use of latex foam in high price, high quality mattresses has been common in the United States for several years, although market share has remained relatively low. Latex foam maintains a much higher share of the mattress materials market in Europe, because latex foam is considered to be a superior product with respect to its comfort and durability properties. Recently, U.S. consumers have been developing a higher sensitivity to sleep habits and a direct association between bedding quality and the quality of sleep. The mattress industry is focused on creating more specialized, higher price, higher quality products resulting in the growth of the latex foam share of mattress cushion materials. Traditionally, latex foam has been shown to display superior resilience, support factor, dynamic and static fatigue resistance when compared to polyurethane foam for cushioning applications. Additionally, latex foam is often advertised to provide superior pressure relief particularly in bedding applications. However, these comparisons have also typically been made between different densities of foam, i.e., 4.2 pcf density Latex foam vs. 2.5 pcf density HR polyurethane foam, while each has a hardness 28 lb. IFD at 25% deflection. Polyurethane foam is not typically formulated in the same density ranges as latex foam for cushion applications with the intention of meeting the significantly marketable differences between urethane and latex. The industry is also focused on finding other materials that perform and feel like these latex foams, such as high resilience polyurethane foams.

High resilience polyurethane foams are produced by reacting an isocyanate with an isocyanate-reactive component containing two or more reactive sites, generally in the presence of blowing agent(s), catalysts, surfactants and other auxiliary additives. The isocyanate-reactive components are typically polyols, polyesters, primary and secondary polyamines, or water. The catalysts used during the preparation of slabstock polyurethane foam promote two major reactions among the reactants, gelling and blowing. These reactions must proceed simultaneously and at a competitively balanced rate during the process in order to yield slabstock polyurethane foam with desired physical characteristics. Flexible slabstock foams are generally open-celled materials, which may require additional processing, such as crushing, to reach a desired openness.

Slabstock foam is produced in a foam machine that mixes the individual reactants, i.e., isocyanate, isocyanate-reactive components, and additives, in a continuous manner through a mix head and deposits the reaction product into a trough. The product begins to froth and rise out of the trough and overflows onto fall plates. On the fall plates, the product continues to rise and contacts a conveyor. The product cures as the conveyor carries it along a length forming the slabstock polyurethane foam. The conveyors are typically lined with a paper or plastic liner to allow for easy removal of the slabstock foam. As the foam exits the machine, it is cut into large blocks.

Various related art patents disclose methods of forming slabstock polyurethane foams. These methods include using blowing agents such as water, air, nitrogen, or carbon dioxide, as shown in U.S. Pat. No. 5,403,088. Typically, carbon dioxide liquid is added directly to the polyol component; however, it is also known in the art that it can be added to either or both components. The polyol component supply must be pressurized to maintain the carbon dioxide in the liquid state. As the product exits the mix head and as it froths and rises, the carbon dioxide changes states from a liquid to a gas and acts as a blowing agent. One primary reason for adding the carbon dioxide in a liquid state is to ensure that there is a sufficient amount of blowing agent to produce the foam having a desired density. However, one disadvantage of using liquid carbon dioxide is that the polyol component supply must be under pressure, which is expensive and can be dangerous to maintain the high pressures.

Yet another method, shown in U.S. Pat. No. 5,360,831, discloses adding carbon dioxide gas as a nucleation gas into either one of the polyol component or the isocyanate component streams for a foam-in-fabric process. The carbon dioxide gas thickens and increases the viscosity of the foaming mass to prevent the reacting components from entering the fine pores of the foam and fabric capsule, which allows these encapsulating materials to remain as is, functional, not compromised. Most importantly, the nucleating gas is thickening the froth to prevent penetration of the foaming mass into the pores of existing foam and fabric, therefore allowing the containing material to remain intact. Foam-in-fabric processes are different from slabstock foam processes in that the foam-in-fabric process is prepared in a batch process and makes only enough foam to fill a mold, whereas the slabstock process involves continuous reacting of the components. Fabric is positioned within the mold, and the components are mixed together and poured into the fabric. The components react, forming a foam that fills the fabric and forms the final product.

The use of other blowing agents, such as nitrogen gas or various other gases, is shown in WO 02/10245. One distinguishing factor between a blowing agent and a nucleation gas is the amount used and the effect that the blowing agent has on the slabstock foam. Typically, when a gas is added as a blowing agent, a large amount of the blowing agent is needed to expand the foam during the frothing and rising stages to control the density of the slabstock foam. The addition of more blowing agents results in a lower density foam.

On the other hand, the related art has used only a single nucleation gas to improve the characteristics of the foam. The nucleation gas, such as nitrogen, carbon dioxide, promotes irregular cell structure and reduces processing of the foam, such as crushing, after it has cured. If too much nitrogen gas is added as the nucleation gas, the cells in the slabstock foam are irregular shaped and become too large forming voids or pits in the slabstock foam. If the slabstock foam has too many voids, the slabstock foam loses its resilience and value. If too much carbon dioxide gas is added as the nucleation gas, the cells are too uniform and too dense. The slabstock foam prepared with too much carbon dioxide gas does not have similar physical properties, or performance characteristics, as that of latex foam. The slabstock foam of the related art in using a single nucleation gas has not yet achieved the latex-like feel, while also achieving the performance characteristics associated with the latex foam.

However, to date, the industry has been unable to produce a slabstock polyurethane foam having performance characteristics of latex foam while also having a substantially similar feel to that of the latex foam. Further, the industry has been unable to produce a slabstock polyurethane foam that is substantially free of toluene diisocyanate (TDI) and formed solely from diphenylmethane diisocyanate (MDI). The slabstock polyurethane foams produced from TDI do not have as improved performance characteristics as slabstock polyurethane foams produced from MDI. U.S. Pat. Nos. 6,068,790 and 5,480,916 and Patent Cooperation Treaty publication WO 01/32735 disclose using mixtures of TDI and MDI. However, they do not disclose using solely MDI as the isocyanate component to produce the slabstock polyurethane foam having latex-like feel and performance characteristics. Great Britain Patent No. 2,093,852 discloses using an isocyanate component having a mixture of MDI and polymethylene polyphenyl polyisocyanates.

Patent Cooperation Treaty publication WO 95/09886 discloses preparing a high resilience foam using an isocyanate component including a mixture of MDI. In each of these references, the foam produced does not have latex-like feel and performance characteristics. Specifically, the '886 publication uses a mixture of 75 parts by weight of 4,4'-MDI and 25 parts by weight of polymeric MDI based on 100 parts by weight of the isocyanate component. The resulting foam has a density of less than 2.9 pcf, a tensile strength of less than 7 psi, and a tear resistance of less than 0.4 ppi. The '886 patent does not disclose forming a polyurethane foam with a density greater than 3 pcf. It would be advantageous to form a polyurethane foam having density greater than 3 pcf that has latex-like feel and performance characteristics.

The industry has been able to achieve polyurethane foam having performance characteristics similar to that of latex foam using TDI and mixtures of TDI and MDI, but the density of the slabstock foam is less than that of the latex foam and it does not have the similar feel of latex foam. The industry has also been able to make a polyurethane foam having a low density solely from MDI, but the foam does not have the required latex-like feel and performance characteristics. Accordingly, it would be advantageous to provide a method of forming a high resilience slabstock polyurethane foam having random cell structures yielding a latex-like feel and performance characteristics, such as a indentation force deflection (IFD) equal to that of latex foam.

BRIEF SUMMARY OF THE INVENTION AND ADVANTAGES

The subject invention provides a method of forming high resilience (HR) slabstock polyurethane foam having random cell structures to produce latex-like feel and characteristics. The method includes the steps of providing an isocyanate-reactive component and providing an isocyanate component substantially free of toluene diisocyanate comprising diphenylmethane-2,4'-diisocyanate present in an amount of from 15 parts by weight to 55 parts by weight based on 100 parts by weight of the isocyanate component and diphenylmethane-4,4'-diisocyanate present in an amount from 45 parts by weight to 85 parts by weight based on 100 parts by weight of the isocyanate component to react with the isocyanate-reactive component. A first nucleation gas is provided under low pressure and is added into at least one of the isocyanate-reactive component and the isocyanate component to produce a first cell structure in the foam. A second nucleation gas, different from the first nucleation gas, is provided under low pressure and is added into at least one of the isocyanate-reactive component and the isocyanate component to produce a second cell structure in the foam that is different from the first cell structure such that the first cell structure and the second cell structure enhance the latex-like feel and characteristics of the slabstock polyurethane foam.

Accordingly, the subject invention provides a HR slabstock polyurethane foam formed from an isocyanate component substantially free of toluene diisocyanate solely from diphenylmethane diisocyanate. The resulting foam has a random cell structure that provides a latex-like feel and performance characteristics. While a combination of two nucleation gases yields the latex-like feel and characteristics, the use of diphenylmethane diisocyanate blends as described, produces the slabstock polyurethane foams having superior physical properties to traditional latex foam. These slabstock polyurethane foams display superior durability by having improved tensile strength, elongation, tear resistance, dynamic and static fatigue resistance compared with latex foam at similar densities. More importantly, these polyurethane foams are in compliance with California Technical Bulletin 117 test (Cal 117), while latex foam is not. Cal-117 compliance is one of the requirements in California or as specified for foams used in residential furnishing. In addition, with the use of additional flame retardant like melamine, these polyurethane foams also meet British Standard 5852:Crib 5 requirement. The HR slabstock polyurethane foam is capable of use in any cushioning application that has traditionally been manufactured with latex foam. The HR slabstock polyurethane foam outperforms similar polyurethane foams formed from TDI and TDI/MDI mixtures and similar latex foams having a substantially similar density and hardness.

BRIEF DESCRIPTION OF THE SEVERAL VIEWS OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
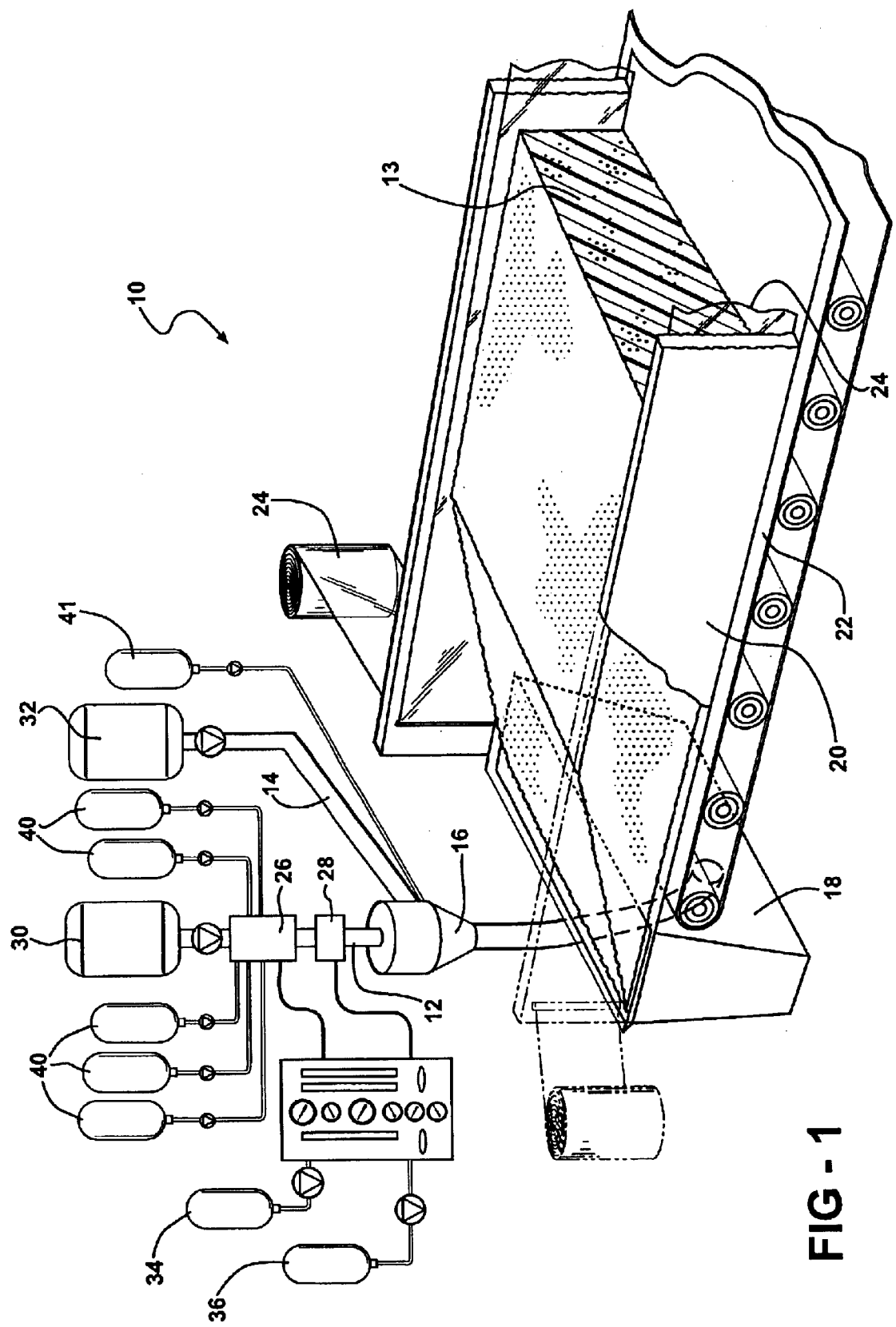
FIG. 1 is a perspective view a slabstock foam forming machine having an isocyanate supply line and an isocyanate-reactive supply line being mixed with nucleation gases and additives prior to feeding into a mix head.

Referring to the Figures, wherein like numerals indicate like or corresponding parts throughout the several views, a slabstock foam forming machine 10 is shown in FIG. 1. The machine 10 is used for forming high resilience (HR) slabstock polyurethane foam having random cell structures to produce latex-like feel and characteristics. The slabstock foam machine 10 includes an isocyanate-reactive supply line 12 and an isocyanate supply line 14. The isocyanate-reactive supply line 12 supplies an isocyanate-reactive component 30 and the isocyanate supply line supplies an isocyanate component 32. Both supply lines 12, 14 feed continuously into a mix head 16 for mixing the two components 30, 32 as they flow through the mix head 16. The mixture of the components initiates a reaction and is continuously deposited into a trough 18. The mixture continues to react in the trough 18 and begins to froth as is known the art. Next, the mixture rises and overflows from the trough 18 onto fall plates 20. The mixture then contacts a conveyor 22 and is carried away from the fall plates 20. The mixture continues to rise along the conveyor 22 and begins to cure forming the slabstock foam 13. As the slabstock foam 13 reaches the end of the conveyor 22, it is cut into blocks of various sizes depending upon the application. The conveyor 22 is lined with a release material 24 to ensure movement of the foam along the conveyor 22.

The isocyanate-reactive supply line 12 has a first manifold 26 and a second manifold 28 disposed upstream from the mix head 16. Each of the manifolds 26, 28 has at least one inlet for adding additional components to the isocyanate-reactive supply line 12. These additional components may include at least one of a nucleation gas, a surfactant, a chain extender, a catalyst, a colorant, a flame retardant, and the like. Alternately, the manifolds 26, 28 may be on the isocyanate supply line 14 or on both supply lines 12, 14.

The method of the subject invention includes the step of providing the isocyanate-reactive component 30. Preferably, the isocyanate-reactive component 30 is selected from at least one of polyols, polyamines, and polyesters. More preferably, the isocyanate-reactive component 30 is a polyol mixture having a functionality of from 2 to 2.75 and a hydroxyl number of from 20 to 40. The polyol mixture may include polyols, polyamines, and polyesters. The polyol mixture is further defined as having a solids content of from 0.1 parts by weight to 30 parts by weight based on 100 parts by weight of the polyol mixture, preferably from 0.1 parts by weight to 25 parts by weight based on 100 parts by weight of the polyol mixture, and more preferably from 0.1 parts by weight to 15 parts by weight based on 100 parts by weight of the polyol mixture. The polyol mixture may be free of any solids and still produce the results according to the subject invention.

The polyols may be selected from at least one of ethylene glycol, diethylene glycol, propylene glycol, dipropylene glycol, butane diol, glycerol, trimethylolpropane, triethanolamine, pentaerythritol and sorbitol. Some polyamines include, but are not limited to, ethylene diamine, toluene diamine, diaminodiphenylmethane and polymethylene polyphenylene polyamines, and aminoalcohols. Examples of aminoalcohols include ethanolamine and diethanolamine, triethanolamine, and mixtures thereof.

The polyesters may be obtained by the condensation of appropriate proportions of glycols and higher functionality polyols with polycarboxylic acids. Still further suitable polyols include hydroxyl-terminated polythioethers, polyamides, polyesteramides, polycarbonates, polyacetals, polyolefins and polysiloxanes. Preferred polyols are the polyether polyols comprising ethylene oxide and/or propylene oxide units. Other polyols that may be used include dispersions or solutions of addition or condensation polymers in polyols of the types described above. Such modified polyols, often referred to as "polymer" polyols have been fully described in the prior art and include products obtained by the in-situ polymerization of one or more vinyl monomers, for example styrene and acrylonitrile, in polymeric polyols, for example polyether polyols, or by the in situ reaction between a polyisocyanate and an amino- or hydroxy-functional compound, such as triethanolamine, in a polymeric polyol. An example of suitable polyols include, but are not limited to, PLURACOL® 2100, PLURACOL® 2115, PLURACOL® 2120, and PLURACOL® 2130, PLURACOL® 2145, PLURACOL® 593, PLURACOL® 945, PLURACOL® 1509, PLURACOL® 1051, PLURACOL® 1385, PLURACOL® 1538, PLURACOL® 381, PLURACOL®726, PLURACOL® 220, PLURACOL® 718, PLURACOL® 1718, PLURACOL®1441, PLURACOL® 1442, PLURACOL® 973, PLURACOL® 1117, PLURACOL® 1543, PLURACOL® 1365 Polyols, which are commercially available from BASF Corporation.

The method also includes the step of providing the isocyanate component 32 to react with the isocyanate-reactive component 30. The isocyanate component 32 is substantially free of toluene diisocyanate and selected from at least two of diphenylmethane-2,4'-diisocyanate, diphenylmethane-4,4'-diisocyanate, and polymeric diphenylmethane diisocyanate. It is to be appreciated that substantially free of toluene diisocyanate means less than 8 parts by weight based on 100 parts by weight of the isocyanate component and preferably less than 5 parts by weight based on 100 parts by weight of the isocyanate component. More preferably, the isocyanate component 32 is completely free of toluene diisocyanate, i.e., 0 parts by weight based on 100 parts by weight of the isocyanate component. However, it is to be understood that the foam may include a minimal amount of toluene diisocyanate, without effecting the latex-like feel and performance characteristics of the polyurethane foam 13.

The diphenylmethane-2,4'-diisocyanate (2,4'-MDI) is present in an amount of from 15 parts by weight to 55 parts by weight by weight based on 100 parts by weight of the isocyanate component to react with the isocyanate-reactive component, preferably form 20 parts by weight to 55 parts by weight, and more preferably from 25 parts by weight to 53 parts by weight based on 100 parts by weight of the isocyanate component. The diphenylmethane-4,4'-diisocyanate (4,4'-MDI) is present in an amount from 45 parts by weight to 85 parts by weight based on 100 parts by weight of the isocyanate component to react with the isocyanate-reactive component, preferably from 45 parts by weight to 80 parts by weight, and more preferably from 45 parts by weight to 85 parts by weight based on 100 parts by weight of the isocyanate component. The polymeric diphenylmethane diisocyanate (PMDI) is present in an amount of from 1 parts by weight to 30 parts by weight based on 100 parts by weight of the isocyanate component in addition to the diphenylmethane-2,4'-diisocyanate and diphenylmethane-4,4'-diisocyanate. Preferably, the PMDI is present in an amount from 5 parts by weight to 28 parts by weight and more preferably from 8 parts by weight to 25 parts by weight based on 100 parts by weight of the isocyanate component. The amounts of the 2,4'-MDI, 4,4'-MDI, and PMDI give the resultant polyurethane foam 13 the latex-like feel and performance characteristics. Also, these amounts of 2,4'-MDI, 4,4'-MDI, and PMDI produces polyurethane foam 13 that outperforms the foam formed from TDI and mixtures of TDI and MDI. An example of suitable isocyanates include, but are not limited to, LUPRANATE® MS, LUPRANATE® M20S, LUPRANATE® MI, and LUPRANATE® M10 LUPRANATE® M70 and LUPRANATE® M200 isocyanates, and No 236 isocyanate, No 233 isocyanate and No 278 isocyanate, which are commercially available from BASF Corporation.

It is preferable that the isocyanate-reactive component 30 is supplied at a rate of from 10 to 500 kilograms per minute and the isocyanate component 32 is supplied at a rate of from 5 to 250 kilograms per minute. The isocyanate component 32 may also be supplied at a pressure of from 10 to 2000 pounds per square inch gauge. The rate of isocyanate-reactive components 30 and isocyanate components 32 depends upon the size of the slabstock polyurethane foam 13 to be formed. These rates can be used to produce slabstock polyurethane foams 13 having a height of from 1 to 50 inches and a width of from 12 to 120 inches. If the resulting slabstock polyurethane foam 13 were larger, then these rates would be increased.

A first nucleation gas 34 is provided under low pressure and is added into at least one of the isocyanate-reactive component 30 and the isocyanate component 32 to produce a first cell structure in the polyurethane foam 13. The first nucleation gas 34 is selected from at least one of carbon dioxide gas and nitrogen gas. Preferably, the first nucleation gas 34 is added into the isocyanate-reactive component 30 and is carbon dioxide gas. However, it is to be appreciated that other gases may behave chemically similar to that of the carbon dioxide gas and may be used with the subject invention. The first nucleation gas 34 may be added at a rate of from 0.1 liters per minute to 30 liters per minute. Preferably, the first nucleation gas 34 is added at a rate of from 2 liters per minute to 20 liters per minute, and more preferably from 5–15 liters per minute. If too much carbon dioxide gas is added, then the first cell structure will be too uniform and too fine, which results in the foam 13 not having a latex-like feel. If too little carbon dioxide gas is added, then the first cell structure is neither uniform nor fine enough.

The subject invention further includes the step of providing a second nucleation gas 36 different than the first nucleation gas 34. The second nucleation gas 36 is provided under low pressure. The second nucleation gas 36 is added into at least one of the isocyanate-reactive component 30 and the isocyanate component 32 to produce a second cell structure in the polyurethane foam 13 different than the first cell structure. The second nucleation gas 36 is selected from at least one of carbon dioxide gas and nitrogen gas. Preferably, the second nucleation gas 36 is added into the isocyanate-reactive component 30 and is nitrogen gas. However, it is to be understood that other gases may behave chemically similar to that of the nitrogen gas and may be used with the subject invention. The second nucleation gas 36 is provided at a rate of from 0.1 liters per minute to 20 liters per minute. Preferably, the second nucleation gas 36 is provided at a rate of from 1 liter per minute to 10 liters per minute, and more preferably from 2–6 liters per minute. If too much nitrogen gas is added, then the second cell structure becomes too irregular, which results in the foam 13 having large voids or "pea holes" and the foam is unacceptable. If too little nitrogen gas is added, then the second cell structure is too uniform, which does not produce the latex-like feel and characteristics.

When determining the amount of the first nucleation gas 34 and the second nucleation gas 36 to be added, the second nucleation gas 36 is added in a ratio of from 1:1 to 1:10 relative to the addition of the first nucleation gas 34. Preferably, the second nucleation gas 36 is added in a ratio of from 1:1 to 1:4 relative to the addition of the first nucleation gas 34. If too much of the first nucleation gas 34 is added relative to the second nucleation gas 36, then the cell structure of the polyurethane foam maybe too random or not random enough to produce the latex-like feel and characteristics. For descriptive purposes only, the subject invention will be described below only in terms of the preferred first and second nucleation gases 34, 36. It is important to have a balance between the carbon dioxide gas and the nitrogen gas, because they compliment one another. The uniform first cell structure produced by the carbon dioxide gas is broken up by the irregular second cell structure of the nitrogen gas and vice versa. Together, both gases produce the slabstock polyurethane foam 13 with the performance characteristics that perform better than the latex foam when comparing foams having similar density and hardness. Specifically, the larger, irregular sized second cell structure improves the resilience and the smaller, regular sized first cell structure improves the appearance and feel of the foam 13.

The subject invention further includes the step of adding at least one additive 40 into at least one of the isocyanate-reactive component 30 and the isocyanate component 32. The additive 40 is selected from at least one of a surfactant, a chain extender, a cross-linker, a catalyst, a colorant, and a flame retardant. A blowing agent 41, preferably water, but may include freon, dichloromethane, acetone, liquid carbon dioxide, chlorofluorocarbons, chlorinated solvents like methylene chloride or trichloroethane, or low-boiling point solvents is also added to the mix head 12. Various types of catalyst known to those skilled in the art include, but are not limited to, amine catalysts or tin catalysts. It is to be appreciated that other additives 40 known to those skilled in the art may be added without deviating from the subject invention. Preferably, the additives 40 are added into the isocyanate-reactive component 30 supply line 12, as illustrated in FIG. 1.

Depending upon the types of isocyanate-reactive component 30, isocyanate component 32, nucleation gases 34, 36, or additives 40, the first nucleation gas 34 may be added in the isocyanate-reactive component 30, while the second nucleation gas 36 is added in the isocyanate component 32. Alternately, the first nucleation gas 34 may be added into the isocyanate component 32, while the second nucleation gas 36 may be added into the isocyanate-reactive component 30. In another embodiment, the first nucleation gas 34 may be added into the isocyanate-reactive component 30 and the second nucleation gas 36 may be added into the isocyanate-reactive component 30.

Referring to FIG. 1, the first nucleation gas 34 is added to the isocyanate-reactive component 30 prior to the addition of the second nucleation gas 36. The isocyanate-reactive component 30 having the first nucleation gas 34 and the second nucleation gas 36 is provided to the mix head 16 in the isocyanate-reactive supply line 12. The isocyanate component 32 is provided to the mix head 16 in the isocyanate supply line 14. Both supply lines 12, 14 enter the mix head 16 and are mixed to initiate a reaction between the isocyanate-reactive component 30 and the isocyanate component 32 to form the slabstock foam 13.

EXAMPLES

The HR polyurethane foam 13 was prepared according to the subject invention having components in part by weight (pbw) set forth in Table 1. Table 1 includes four formulations, Examples A–D for polyurethane foam 13 that includes a mixture of MDI as the isocyanate component 32. These examples were produced in a small-scale batch process for comparison testing. Examples of a scaled-up continuous slabstock foam process are described below in more detail. The isocyanate index, as is known in the art, is the ratio of NCO groups in the isocyanate component to the OH groups in the isocyanate-reactive components.

TABLE 1

Formulation of HR Polyurethane Foams

| Formulation, pbw | Example A | Example B | Example C | Example D |
|---|---|---|---|---|
| Isocyanate-reactive Component A | 0.00 | 0.00 | 43.50 | 43.50 |
| Isocyanate-reactive Component B | 100.00 | 100.00 | 56.50 | 56.50 |
| Water | 1.55 | 1.55 | 1.55 | 1.55 |
| Cross-Linker | 0.20 | 0.25 | 0.20 | 0.20 |
| Surfactant A | 0.00 | 0.00 | 2.00 | 0.00 |
| Surfactant B | 2.00 | 2.50 | 0.00 | 2.50 |
| Amine Catalyst A | 0.08 | 0.15 | 0.08 | 0.15 |
| Amine Catalyst B | 0.10 | 0.03 | 0.10 | 0.03 |
| Tin Catalyst | 0.00 | 0.08 | 0.10 | 0.10 |
| Flame Retardant | 3.00 | 3.00 | 3.00 | 3.00 |
| Isocyanate component A | 29.03 | 0.00 | 32.06 | 0.00 |
| Isocyanate component B | 0.00 | 30.06 | 0.00 | 29.70 |
| Isocyanate Index | 105 | 105 | 105 | 105 |

Examples A and B are formed from an isocyanate-reactive component having 0 parts by weight based on 100 parts by weight of the isocyanate-reactive component solids. Examples C and D are formed from an isocyanate-reactive component having 13.5 parts by weight based on 100 parts by weight of the isocyanate-reactive component solids. A suitable isocyanate-reactive component A is PLURACOL® 2130 Polyol, commercially available from BASF Corporation and a suitable isocyanate-reactive component B is PLURACOL® 2100 Polyol, commercially available from BASF Corporation. Examples A and C include an isocyanate component having 45 parts by weight 2,4'-MDI, 45 parts by weight 4,4'-MDI, and 10 parts by weight PMDI based on 100 parts by weight of the isocyanate component and having a NCO content of 33.14%. The isocyanate component is a mixtures of LUPRANATE® MS, LUPRANATE® M20S, and LUPRANATE® MI Isocyanates, commercially available from BASF Corporation. Examples B and C include an isocyanate component having 52 parts by weight 2,4'-MDI and 48 parts by weight 4,4'-MDI based on 100 parts by weight of the isocyanate component and having a NCO content of 33.56%. A suitable isocyanate component is LUPRANATE® MI Isocyanate, commercially available from BASF Corporation.

The cross-linker is diethanolamines (DEOA-LF), commercially available from Chem Central. Surfactant A is NIAX® Silicone U-2000, commercially available from Crompton OSI. Surfactant B is DABCO® 5043, commercially available from Air Products and Chemicals, Inc. A suitable amine catalyst A is DABCO® 33LV, commercially available from Air Products and Chemicals, Inc. and a suitable amine catalyst B is DABCO® BL-11, commercially available from Air Products and Chemicals, Inc. The tin catalyst is DABCO® T-12, commercially available from Air Products and Chemicals, Inc. A suitable flame retardant is Antiblaze 100, commercially available from Albright & Wilson Americas or Rhodia.

Examples A–D were cut into 4" thick pieces and tested. The various tests included determining a density (lb/ft$^3$ or pcf) of the sample, an amount of force (Lb$_r$) to achieve 25% indentation force deflection (IFD) of the sample, and a support factor for the sample. The support factor is the amount of force required to achieve 65% IFD divided by the amount of force to achieve 25% IFD. Another test measured a percentage of hysteresis loss, which is a loss of elasticity of the sample. These specific tests tend to indicate a "feel" of the polyurethane foam 13 for comparative analysis to the latex foam. Also, density may vary from the polyurethane foam 13 and latex foam by up to 0.5 pcf, without affecting the feel. The relatively high density of the foams 13 can withstand a variance of up to 0.7 pcf without much difference in feel. The IFD can be used to determine similarity of feel between the polyurethane foam 13 and latex foam, but it is preferable to rely on both the density and IFD.

Tensile (lb/ft$^2$ or psi), elongation (%), and tear resistance (lb/in or ppi) tests were performed on each of the samples in accordance with ASTM D-3574. Tensile strength, tear resistance, and elongation properties describe the ability of the material to withstand handling during manufacturing or assembly operations. Another test determined a resilience of the sample by dropping a steel ball from a predetermined height onto the sample and measuring a peak height that the ball bounces. The resilience is expressed in percent of the predetermined height.

These various tests were also performed on latex foam samples. The latex foam sample was obtained from FoamOrder.com and was purchased as a Talalay Latex Twin Mattress. The latex foam was originally 6" thick and was cut down two inches to a thickness of 4".

TABLE 2

Physical Properties For HR Polyurethane Foam vs. Latex Foam

| Physical Properties | Example A | Example B | Example C | Example D | Comparative Latex Example |
|---|---|---|---|---|---|
| Density (pcf) | 4.71 | 4.41 | 3.68 | 4.32 | 4.33 |
| IFD, lb/50 in$^2$ (4 in.); 25% | 41.00 | 35.00 | 35.00 | 61.00 | 26.00 |
| IFD, 65% | 107.00 | 83.00 | 88.00 | 134.00 | 66.00 |
| IFD, 25% Return | 35.00 | 29.00 | 30.00 | 49.00 | 20.00 |
| Support Factor | 2.60 | 2.40 | 2.50 | 2.20 | 2.70 |
| Recovery, % | 86.00 | 83.00 | 86.00 | 80.00 | 78.00 |
| Hysteresis, % | 28.00 | N/A | 24.00 | N/A | 30.00 |
| Resilience, % | 52.00 | 41.00 | 60.00 | 49.00 | 54.00 |
| Tensile strength (psi) | 13.00 | 24.00 | 17.00 | 29.00 | 6.00 |
| Elongation (%) | 114.00 | 264.00 | 96.00 | 180.00 | 101.00 |
| Tear resistance (ppi) | 2.00 | 4.10 | 1.50 | 4.19 | 0.93 |

From Table 2, Examples A–D have a density that is within 0.6 pcf of the Comparative Latex Example. Examples A–D have a larger IFD value at 25%, but on a small scale batch of the polyurethane foam 13, the IFD value may be larger, while other properties remain similar to or better than the Comparative Latex Example. Examples A–D have a latex-like feel that is similar to that of the Comparative Latex Example. Example A has an increased recovery factor of 10% relative to that of Comparative Latex Example. Example B has an increased recovery factor of 6% relative to that of Comparative Latex Example. Example C has an increased recovery factor of 10% relative to that of Comparative Latex Example. Example D has an increased recovery factor of 3% relative to that of Comparative Latex Example. Examples A–D also has significantly better tensile strength, elongation, and tear resistance properties.

The polyurethane foam 13 can be produced to have improved performance characteristic over those shown in Table 2 with the additional processing steps set forth above according to the subject invention. Table 3 includes three formulations of the HR polyurethane foam 13 to be made in a slabstock process according to the subject invention. Table 3 also includes formulations of three comparative examples of polyurethane foam 13 formed from TDI.

TABLE 3

Formulation of HR Slabstock Polyurethane Foam

| Formulation, pbw | Example 1 | Example 2 | Example 3 | Comparative TDI Example 1 | Comparative TDI Example 2 | Comparative TDI Example 3 |
|---|---|---|---|---|---|---|
| Isocyanate-reactive component | 100 | 100 | 100 | 100 | 100 | 100 |
| Colorant | 2.00 | 2.00 | 2.00 | 2.00 | 2.00 | 2.00 |
| Water total | 1.50 | 1.50 | 1.50 | 1.50 | 1.50 | 1.50 |
| Water in polyol | 0.20 | 0.20 | 0.20 | 0.02 | 0.02 | 0.02 |
| Water added | 1.40 | 1.40 | 1.40 | 1.33 | 1.33 | 1.33 |
| Cross-linker | 0.50 | 0.50 | 0.50 | 1.00 | 1.00 | 1.00 |
| Surfactant | 2.20 | 2.20 | 2.20 | 2.20 | 2.20 | 2.20 |
| Amine Catalyst | 0.60 | 0.60 | 0.60 | 0.80 | 0.80 | 0.80 |
| Tin Catalyst | 0.20 | 0.20 | 0.20 | 0.60 | 0.60 | 0.60 |
| Flame Retardant | 4.00 | 4.00 | 4.00 | 4.00 | 4.00 | 4.00 |
| Isocyanate Component - MDI | 27.85 | 25.07 | 22.28 | 0.00 | 0.00 | 0.00 |
| Isocyanate Component - TDI | 0.00 | 0.00 | 0.00 | 20.57 | 18.51 | 16.45 |
| Isocyanate index | 100 | 90 | 80 | 100 | 90 | 80 |
| Total PBW | 138.8 | 136.0 | 133.2 | 132.5 | 130.4 | 128.4 |

The isocyanate-reactive component is a polyol mixture from PLURACOL® 2100, and PLURACOL® 2130 Polyols commercially available from BASF Corporation, having a solids content of 14%. The colorant is Blue 8515, sold under the trademark Reactint, commercially available from Milliken Chemical. The cross-linker is diethanolamines (DEOA-LF), commercially available from Chem Central. The surfactant is NIAX® U-2000 Silicone, commercially available from Crompton OSI. The amine catalyst is DABCO® 33-LV, commercially available from Air Products and Chemicals, Inc., and NIAX® A-1, commercially available from Crompton OSI. The tin catalyst is DABCO® T-12, commercially available from Air Products and Chemicals, Inc. The flame retardant is AntiBlaze 100 commercially available from Albright & Wilson Americas or Rhodia. The isocyanate component is LUPRANATE® MS, LUPRANATE® M20S, LUPRANATE® MI, and LUPRANATE® M10 Isocyanates, commercially available from BASF Corporation.

Each of the above examples were processed in the slabstock foam forming machine 10 according to the processing conditions set forth in Table 4.

TABLE 4

Processing Conditions for preparing HR Slabstock Polyurethane Foam

| Calibrations, Kg/min. | Example 1 | Example 2 | Example 3 | Comparative TDI Example 1 | Comparative TDI Example 2 | Comparative TDI Example 3 |
|---|---|---|---|---|---|---|
| Isocyanate Component-A | 17.06 | 15.67 | 14.22 | 0.00 | 0.00 | 0.00 |
| Isocyanate Component-TDI | 0.00 | 0.00 | 0.00 | 13.19 | 12.06 | 10.89 |

TABLE 4-continued

Processing Conditions for preparing HR Slabstock Polyurethane Foam

| Calibrations, Kg/min. | Example 1 | Example 2 | Example 3 | Comparative TDI Example 1 | Comparative TDI Example 2 | Comparative TDI Example 3 |
|---|---|---|---|---|---|---|
| Isocyanate-reactive component | 61.00 | 63.00 | 64.00 | 64.00 | 65.00 | 66.00 |
| Colorant | 1.20 | 1.30 | 1.30 | 1.30 | 1.30 | 1.30 |
| Water added | 0.86 | 0.88 | 0.89 | 0.85 | 0.87 | 0.88 |
| Cross-linker | 0.31 | 0.31 | 0.32 | 0.64 | 0.65 | 0.66 |
| Surfactant | 1.35 | 1.38 | 1.40 | 1.41 | 1.43 | 1.46 |
| Amine Catalyst | 0.37 | 0.38 | 0.38 | 0.51 | 0.52 | 0.53 |
| Tin Catalyst | 0.12 | 0.13 | 0.13 | 0.39 | 0.39 | 0.40 |
| Flame Retardant | 2.45 | 2.50 | 2.55 | 2.57 | 2.61 | 2.65 |
| Processing Conditions | | | | | | |
| Temp. F | 86 | 86 | 86 | 88 | 88 | 88 |
| Isocyanate Temp. F | 81 | 81 | 81 | 67 | 67 | 67 |
| Isocyanate Pres., psi | 470 | 444 | 427 | 431 | 425 | 470 |
| Rm Temp. | 84/37/ | 84/37/ | 84/37/ | 78/38/ | 78/38/ | 78/38/ |

TABLE 4-continued

Processing Conditions for preparing HR Slabstock Polyurethane Foam

| Calibrations, Kg/min. | Example 1 | Example 2 | Example 3 | Comparative TDI Example 1 | Comparative TDI Example 2 | Comparative TDI Example 3 |
|---|---|---|---|---|---|---|
| °F./Humid %/Atm | 29.5 | 29.5 | 29.5 | 29.2 | 29.2 | 29.2 |
| Mixer Speed, RPM | 4500 | 4500 | 4500 | 4500 | 4500 | 4500 |
| N2 Gas Pressure, psig | 25.00 | 25.00 | 25.00 | 25.00 | 25.00 | 25.00 |
| N2 Gas Flow Rate, L/m | 1.80 | 1.80 | 1.80 | 1.80 | 1.80 | 1.80 |
| CO2 Gas Pressure, psig | 44.00 | 44.00 | 44.00 | 38.00 | 38.00 | 38.00 |
| CO2 Gas Flow Rate, L/m | 6.50 | 6.50 | 6.50 | 6.00 | 6.00 | 6.00 |

The resulting slabstock polyurethane foams 13 were allowed to cure for 24–48 hours. The slabstock polyurethane foam 13 was cut into 4" thick pieces for use in various tests. In addition to the tests described above for Examples A–D, the samples of Examples 1–3 and Comparative TDI Examples 1–3 were also tested to determine if meeting the California Technical Bulletin 117 Test, which exposes the samples to an open flame. The amount of time that the samples exhibit a flame after the open flame is removed is recorded as is a length of a char mark from the open flame.

The samples were also measured for their ability to withstand wear and tear resistance according to ASTM D-4065 by being subjected to a pounding of a predetermined weight for 80,000 cycles. An original sample height was measured and an original amount of force was determined to reach a value of 40% IFD. Then the sample was subjected to a pounding of the predetermined weight for 80,000 cycles. The sample height was then remeasured and the percentage of height loss was determined. The amount of force required to reach 40% IFD was also determined and the percentage of 40% IFD loss was determined.

The results of each of the above tests are summarized in Table 5.

TABLE 5

HR Polyurethane Foam from MDI vs. HR Polyurethane Foam from TDI

| Physical Properties | Example 1 | Example 2 | Example 3 | Comparative TDI Example 1 | Comparative TDI Example 2 | Comparative TDI Example 3 |
|---|---|---|---|---|---|---|
| Density, pcf | 3.83 | 3.96 | 4.31 | 3.87 | 4.29 | 4.79 |
| Tensile strength, psi | 23.00 | 24.00 | 21.00 | 25.00 | 23.00 | 14.00 |
| HTAG Tensile strength, psi | 23.00 | 21.00 | 20.00 | 23.00 | 21.00 | 19.00 |
| Elongation, % | 214 | 237 | 256 | 176 | 210 | 167 |
| HTAG Elongation, % | 182 | 186 | 200 | 140 | 140 | 139 |
| Tear resistance, ppi | 3.40 | 3.20 | 3.00 | 2.50 | 2.50 | 2.30 |
| Resilience, % | 54.00 | 48.00 | 44.00 | 60.00 | 51.00 | 45.00 |
| IFD, lb./50 sq. in. (4 in.) | | | | | | |
| 25% | 22.80 | 20.50 | 18.50 | 25.30 | 20.00 | 17.60 |
| 65% | 65.20 | 58.10 | 52.60 | 68.80 | 58.80 | 53.70 |
| 25% Return | 19.10 | 17.30 | 15.80 | 22.00 | 17.30 | 15.30 |
| Support Factor | 2.86 | 2.83 | 2.85 | 2.72 | 2.94 | 3.05 |
| Recovery, % | 83.00 | 84.00 | 85.00 | 87.00 | 87.00 | 87.00 |
| Hysteresis, % | 25.00 | 24.00 | 23.00 | 20.00 | 21.00 | 21.00 |
| Fatigue Properties Pounding, I3 | | | | | | |
| Height, % Loss | 1.00 | 0.90 | 0.80 | 1.10 | 1.30 | 1.20 |
| 40% IFD, % Loss | 15.00 | 12.00 | 13.00 | 11.00 | 11.00 | 11.00 |
| Flammability Properties Cal. T.B. 117 Vertical Open Flame | | | | | | |
| Afterflame, Sec. (ave.) | 0.00 | 0.00 | 0.00 | 0.00 | 0.00 | 0.00 |
| Char Length, In. (ave.) | 1.20 | 1.20 | 1.00 | 1.40 | 2.10 | 2.20 |
| Afterflame, Sec. (ave.) HT | 0.00 | 0.00 | 0.00 | 0.00 | 0.00 | 0.00 |
| Char Length, In. (ave.) HT Cal. T.B. 117 Smoldering | 1.20 | 1.10 | 1.30 | 1.10 | 1.00 | 0.90 |
| Crushed | 100.0 | 99.90 | 99.90 | 99.80 | 99.30 | 99.30 |
| Uncrushed | 99.60 | 99.90 | 99.90 | 99.90 | 99.50 | 99.90 |

Referring to Table 5, Example 1 and Comparative TDI Example 1 have a density that is within 0.5 pcf of each other and an IFD value at 25% within 2.5. Example 1 has an increased support factor of 5% relative to that of Comparative TDI Example 1 and an increase in the hysteresis percentage of 25%. Example 1 also has significantly better elongation and tear resistance properties as set forth in Table 5. With reference to Table 2, Example 1, which is illustrative of the subject invention, has a density within 0.5 pcf of the Comparative Latex Example and an IFD value at 25% within 3.2. Therefore, Example 1 has a latex-like feel that is similar to that of Comparative Latex Example. Example 1 has an increased recovery of 6% and has a resilience equal to that of the Comparative Latex Example. Example 1 also has an increased support factor of 6%. Example 1 also has significantly better tensile strength, elongation, and tear resistance properties compared to the Comparative Latex Example set forth in Table 2.

Example 2 and Comparative TDI Example 2 have a density that is within 0.33 pcf of each other and an IFD value at 25% within 0.50. Example 2 has an increased hysteresis percentage of 14% relative to that of Comparative TDI Example 2. Example 2 also has better tensile strength, elongation, and tear resistance properties compared to Comparative TDI Example 2. With reference back to Table 2, Example 2 has a density within 0.37 pcf of the Comparative Latex Example and an IFD value at 25% within 0.5. Therefore, Example 2 has a latex-like feel that is similar to that of Comparative Latex Example. Example 2 has an increased recovery of 8% relative to the Comparative Latex Example and an increased support factor of 5%. Example 2 also has significantly better tensile strength, elongation, and tear resistance properties compared to the Comparative Latex Example set forth in Table 2.

Example 3 and Comparative TDI Example 3 have a density that is within 0.48 pcf of each other and an IFD value at 25% within 0.9. Example 3 has an increased hysteresis percentage of 10% relative to that of Comparative TDI Example 3. Example 3 also has better tensile strength, elongation, and tear resistance properties compared to Comparative TDI Example 3. With reference back to Table 2, Example 3 has a density within 0.02 pcf of the Comparative Latex Example and an IFD value at 25% within 7.5. Therefore, Example 3 has a latex-like feel that is similar to that of Comparative Latex Example. Example 3 has an increased recovery of 9% relative to the Comparative Latex Example and an increased support factor of 6%. Example 3 also has significantly better tensile strength, elongation, and tear resistance properties compared to the Comparative Latex Example set forth in Table 2.

Obviously, many modifications and variations of the present invention are possible in light of the above teachings. The invention may be practiced otherwise than as specifically described within the scope of the appended claims.

What is claimed is:

1. A method of forming high resilience slabstock polyurethane foam having random cell structures, said method comprising the steps of:
    reacting an isocyanate-reactive component and an isocyanate component to form a polyurethane foam;
    wherein the isocyanate component is substantially free of toluene diisocyanate and comprises diphenylmethane-2,4'-diisocyanate present in an amount of from 15 parts by weight to 55 parts by weight based on 100 parts by weight of the isocyanate component;
    providing a first nucleation gas under low pressure;
    adding the first nucleation gas into at least on of the isocyanate-reactive component and the isocyanate component to produce a first cell structure in the polyurethane foam; and
    providing a second nucleation gas under low pressure, wherein the second nucleation gas is different than the first nucleation gas; and
    adding the second nucleation gas into at least one of the isocyanate-reactive component and the isocyanate component in a ratio of from 1:1 to 1:10 relative to the addition of the first nucleation gas to produce a second cell structure in the polyurethane foam different from the first cell structure.

2. A method as set forth in claim 1 wherein the step of providing the isocyanate component is further defined as providing an isocyanate component comprising polymeric diphenylmethane diisocyanate present in an amount of from 1 parts by weight to 30 parts by weight based on 100 parts by weight of the isocyanate component in addition to the diphenylmethane-2,4'-diisocyanate and diphenylmethane-4,4'-diisocyanate.

3. A method as set forth in claim 2 wherein the step of providing an isocyanate-reactive component is further defined as providing a polyol mixture having a functionality of from 2 to 2.75 and a hydroxyl number of from 20 to 40.

4. A method as set forth in claim 3 wherein the step of providing the polyol mixture is further defined as providing the polyol mixture having a solids content of from 0.1 parts by weight to 30 parts by weight based on 100 parts by weight of the polyol mixture.

5. A method as set forth in claim 3 wherein the step of providing the polyol mixture is further defined as providing the polyol mixture having a solids content of from 0.1 parts by weight to 15 parts by weight based on 100 parts by weight of the polyol mixture.

6. A method as set forth in claim 4 wherein the step of adding the first nucleation gas is further defined as adding the first nucleation gas into the isocyanate-reactive component.

7. A method as set forth in claim 6 wherein the step of adding the second nucleation gas is further defined as adding the second nucleation gas into the isocyanate-reactive component.

8. A method as set forth in claim 7 wherein the step of adding the first nucleation gas is further defined as adding the first nucleation gas prior to the addition of the second nucleation gas.

9. A method as set forth in claim 8 wherein the step of adding the first nucleation gas is further defined as adding a first nucleation gas selected from at least one of carbon dioxide gas and nitrogen gas.

10. A method as set forth in claim 9 wherein the step of adding the second nucleation gas is further defined as adding a second nucleation gas selected from at least one of carbon dioxide gas and nitrogen gas.

11. A method as set forth in claim 10 further comprising the step of adding at least one additive into at least one of the isocyanate-reactive component and the isocyanate component.

12. A method as set forth in claim 11 wherein the step of adding at least one additive is further defined as adding an additive selected from at least one of a surfactant, a chain extender, a catalyst, a colorant, and a flame retardant.

13. A method as set forth in claim 8 wherein the step of adding the first nucleation gas is further defined as adding carbon dioxide gas.

14. A method as set forth in claim 13 wherein the step of adding the second nucleation gas is further defined as adding nitrogen gas.

15. A method as set forth in claim 8 wherein the step of adding the second nucleation gas is further defined as adding the second nucleation gas in a ratio of from 1:1 to 1:4 relative to the addition of the first nucleation gas.

16. A method as set forth in claim 8 wherein the step of adding the first nucleation gas is further defined as adding the first nucleation gas at a rate of from 0.1 liters per minute to 30 liters per minute.

17. A method as set forth in claim 16 wherein the step of adding the second nucleation gas is further defined as adding the second nucleation gas at a rate of from 0.1 liters per minute to 20 liters per minute.

18. A method as set forth in claim 8 wherein the step of adding the first nucleation gas is further defined as adding the first nucleation gas at a rate of from 2 liters per minute to 20 liters per minute.

19. A method as set forth in claim 18 wherein the step of adding the second nucleation gas is further defined as adding the second nucleation gas at a rate of from 1 liter per minute to 10 liters per minute.

20. A method as set forth in claim 19 wherein the step of providing the isocyanate-reactive component is further defined as providing an isocyanate-reactive component at a rate from 10 to 500 kilograms per minute.

21. A method as set forth in claim 20 wherein the step of providing the isocyanate component is further defined as providing an isocyanate component at a rate from 5 to 250 kilograms per minute.

22. A method as set forth in claim 6 wherein the step of adding the second nucleation gas is further defined as adding the second nucleation gas into the isocyanate component.

23. A method as set forth in claim 5 wherein the step of adding the first nucleation gas is further defined as adding the first nucleation gas into the isocyanate component and wherein the step of adding the second nucleation gas is further defined as adding the second nucleation gas into the isocyanate-reactive component.

* * * * *